United States Patent [19]

Zenz et al.

[11] Patent Number: 5,034,196
[45] Date of Patent: Jul. 23, 1991

[54] PARTICLE FRACTIONATOR EMPLOYING MULTIPLE FLUIDIZED BED MODULES

[76] Inventors: Frederick A. Zenz, P.O. Box 241, Route 9D, Garrison, N.Y. 10524; Thierry LePalud, 6 Place du General Leclerc, 59440 Avesnes Sur Helpe, France

[21] Appl. No.: 238,015

[22] Filed: Aug. 29, 1988

[51] Int. Cl.⁵ ............................ F27B 15/12; B01J 8/26
[52] U.S. Cl. ............................ 422/142; 34/57 A; 110/245; 422/141; 422/147; 431/7; 431/170
[58] Field of Search .................... 422/141, 142, 147; 34/57 A; 110/245; 122/4 D

[56] References Cited

U.S. PATENT DOCUMENTS

| | | | |
|---|---|---|---|
| 2,797,908 | 7/1957 | Zubrzycki | 422/139 X |
| 2,829,955 | 4/1958 | Goedkoop | 422/141 |
| 2,842,102 | 7/1958 | Blaskowski | 122/4 D |
| 2,895,906 | 7/1959 | Harper | 422/144 X |
| 3,236,607 | 2/1966 | Porter, Jr. et al. | 422/141 |
| 3,241,520 | 3/1966 | Wurster et al. | 34/57 A |
| 3,565,827 | 2/1971 | Friday | 422/142 X |
| 3,625,165 | 12/1971 | Ishigaki | 110/245 X |
| 3,745,668 | 7/1973 | Vian-Ortuno et al. | 34/57 A |
| 4,017,422 | 4/1977 | Gappa . | |
| 4,399,106 | 8/1983 | Ueda | 422/140 |
| 4,464,247 | 8/1984 | Thacker | 422/142 X |
| 4,492,184 | 1/1985 | Norton et al. | 122/4 D |
| 4,925,632 | 5/1990 | Thacker et al. | 422/142 |

Primary Examiner—Robert J. Warden
Assistant Examiner—Amalia Santiago
Attorney, Agent, or Firm—William P. Keegan

[57] ABSTRACT

A fluid bed processing apparatus in which a series of individual fluid bed modules are arranged horizontally alongside each other in a linear or circular configuration with the bed material overflowing weirs between each module in moving from the feed stock input module to a discharge module.

3 Claims, 2 Drawing Sheets

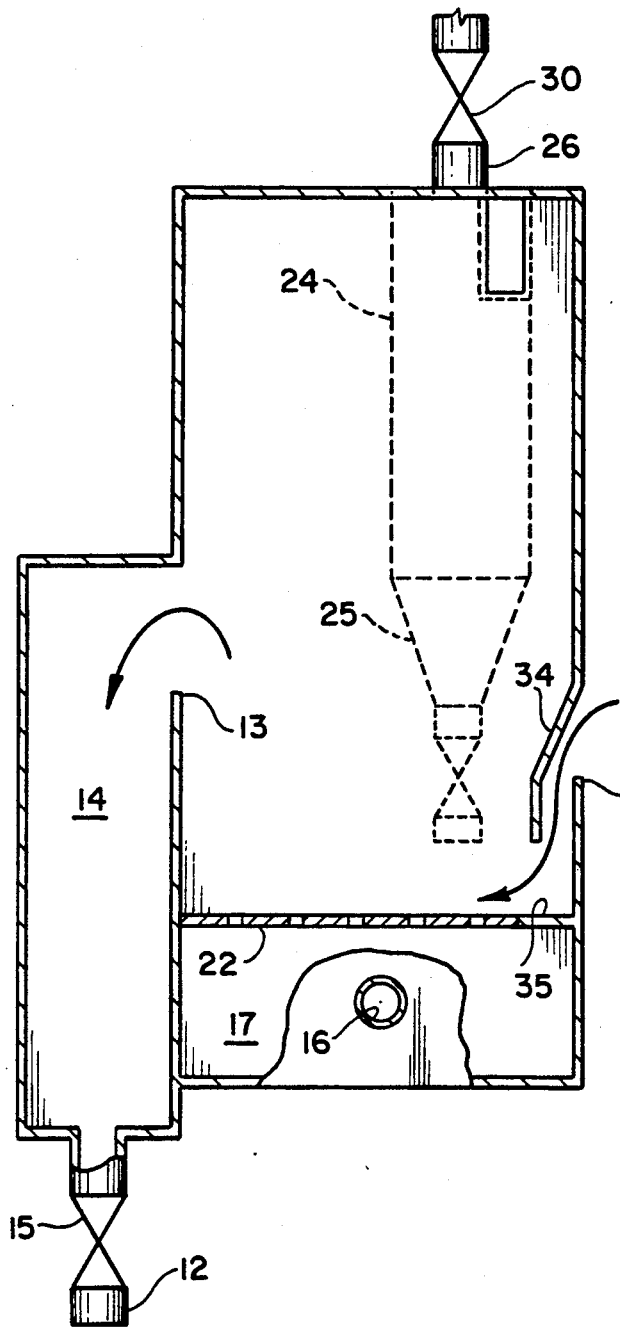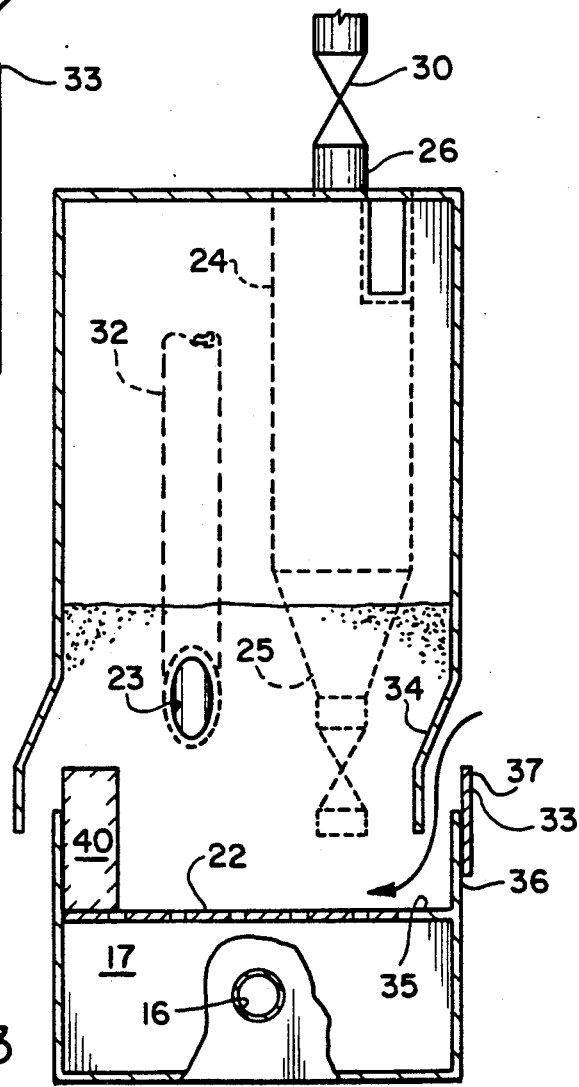
FIG.2
FIG.3

PARTICLE FRACTIONATOR EMPLOYING MULTIPLE FLUIDIZED BED MODULES

FIELD OF THE INVENTION

The invention relates to a fluidized bed processing apparatus, and more particularly to such an apparatus in which a plurality of fluidized bed units are arranged horizontally so that the processed material in each bed flows to the next adjacent bed over a weir located between the beds. The apparatus may be used in a method for particle classification.

BACKGROUND OF THE INVENTION

Fluidization has been successfully applied to a large number of unit operations as well as to catalytic reactions. A conventional fluidized bed is characterized by very rapid solids mixing, vertically, horizontally, and radially, so that the bed remains homogeneous in particle size, product composition, and temperature. However, in some industrial or chemical processes this very high overall mixing is not desirable since it reduces the efficiency of the process. In those particular cases it would be preferable to attain such uniformity and homogeneity within small layered segments of the bed. This can be achieved with a controllable plug flow of solids from laYer to layer to attain the desired stepped size distribution, product composition, or temperature gradient.

In the past such small layered bed segments have been manifested as a superposed series of fluidized beds, one above the other, with solids overflowing into downcomer tubes leading to a lower bed. A disadvantage of this stacked bed arrangement is that the fluidizing gas bearing entrained material flows upwardly from one bed through the support grid of the following bed above with the result that all the upper stages or beds are enriched in the finest particle sizes while the lower stages are enriched in the coarsest particle sizes. This in turn results in an internal gradient which may be detrimental to the reaction process, particularly if the particles constitute a catalyst. In order to reduce this inevitable size gradient phenomenon, the beds must be separated by at least the transport disengaging height (TDH) distance, and this leads to undesirably tall reaction vessels if a large number of fluidized bed stages is necessary.

A further disadvantage of reaction vessels comprising vertically stacked fluidized beds is that pressure drop limitations caused by a backup of material in downcomers preclude operation with deep beds (which may be desired to provide the requisite processing time in the bed) unless there are commensurate large bed to bed spacings. Moreover, downcomers between superposed beds are often unstable with respect to solids flow and are prone to pluggage if the material is not free flowing.

Another disadvantage of vertically stacked fluidized beds is that the grids supporting higher beds are subject to pluggage by the solids entrained in the fluidizing gas from the bed below. Also, stacked beds generally exhibit large pressure drops so that high pumping energy is required for the fluidizing gas.

GENERAL DESCRIPTION OF THE INVENTION

An object of the invention is to provide an improved fluidized bed reactor that circumvents all of the aforementioned disadvantages of a stacked multi-bed reactor.

Another object of the invention is to provide a multi-bed reactor that affords controllable flow of material from one bed to the next subsequent bed in the solids flow path.

Still another object of the invention is to provide a multi-bed reactor that permits either homogeneity in particle size distribution among all beds of the reactor, or a controllably accelerated elutriative stripping or enriching of the individual beds to achieve a maximum size difference or gradient between the feed and the drawoff ends of the reactor.

Yet another object of the invention is to provide a multi-bed reactor that permits a variable residence or processing time for the solids at any desired bed along the path of solids flow.

Another object of the invention is to provide a multi-bed reactor that enables a simple modular construction so as to permit easy expansion of the solids flow path, i.e., increasing the number of fluidized beds, without substantial cost or without exceeding structural limits imposed by the original reactor foundation.

Still another object of the invention is to provide a multi-bed reactor that is readily expandable by the addition of more fluidized beds without requiring gas compressors (for the fluidizing gas) with higher compression ratios.

Another object of the invention is to provide a multi-bed reactor in which very large rates of particle flow between beds can be achieved with little energy consumption.

Another object of the invention is to provide a multi-bed reactor in which the fluidizing beds can be arranged in the annulus between two concentric cylinders, thereby lending itself to high pressure operations.

In carrying out the invention a plurality of fluid bed reactor stages are serially arranged in a horizontal configuration with one reactor stage being connected to the adjacent reactor stage by an overflow weir that controls the solids flow from one stage to the next. Each fluid bed stage is provided with its own fluidizing gas supply and cyclone means for separating the elutriated particles from the exiting gas flow. The elutriated material may be collected as product or it may be fed to the solids bed at any stage of the reactor. Feed stock will be fed to the initial or first stage of the reactor, and the same or a different feed stock may be introduced to any other stage of the reactor depending on the process for which the reactor is used. For high pressure operations the stages may be confined in the annulus between two cylinder walls.

Features and advantages of the invention may be gained from the foregoing and from the following description of a preferred embodiment of the invention.

DESCRIPTION OF THE DRAWING

FIG. 2 is a schematic view showing the final stage of the horizontally arranged multi-bed reactor of the present invention from which the processed solids are drawn off;

FIG. 3 is a schematic view similar to FIG. 2 but showing an intermediate stage of the reactor.

DETAILED DESCRIPTION OF THE INVENTION

Figure 1:
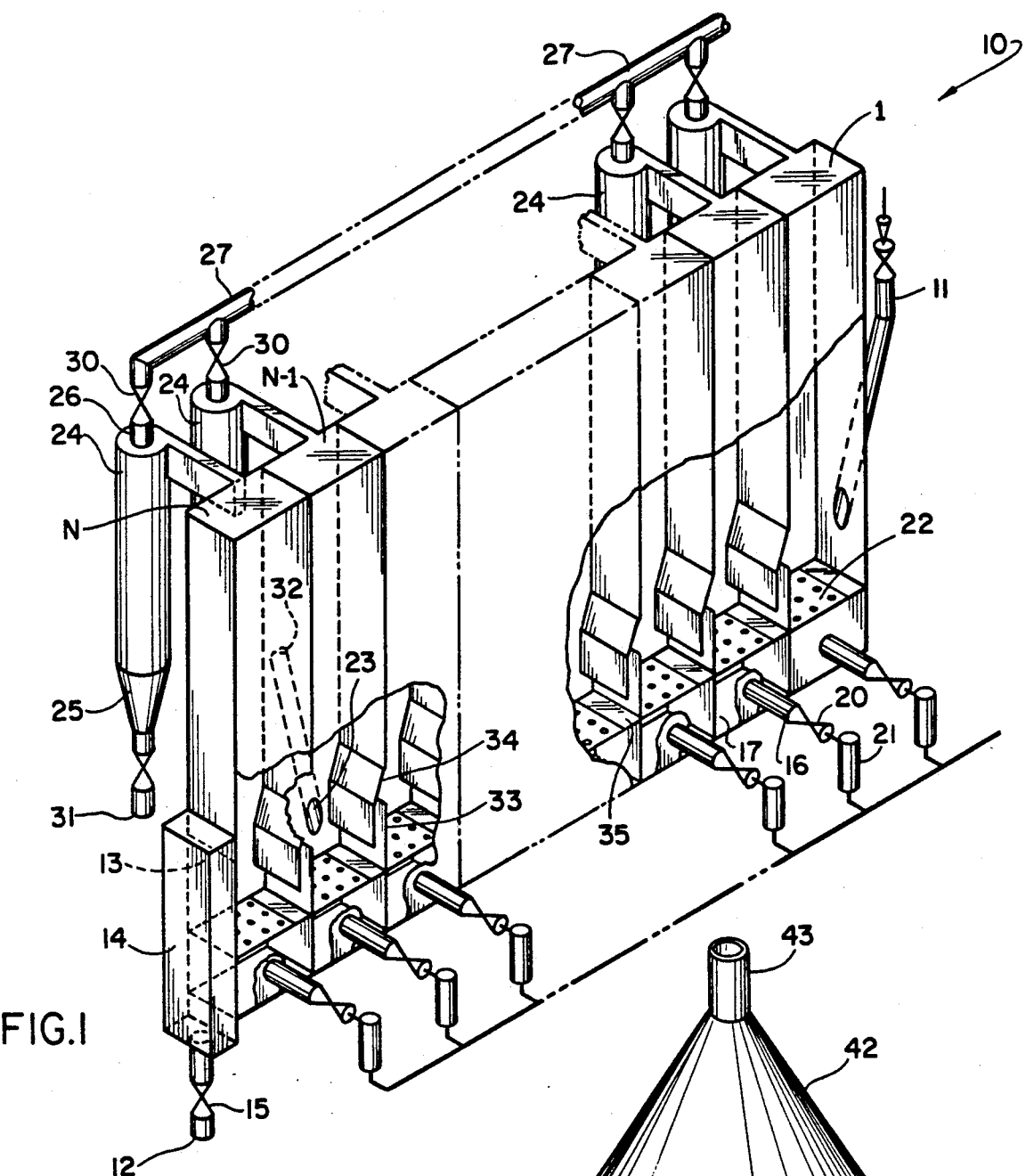
FIG. 1 schematically illustrates a multi-bed reactor in which the individual fluidizing beds are arranged in a horizontal configuration in accordance with the teachings of the present invention.

Referring to FIG. 1 of the drawing, a multi-bed reactor 10 is shown comprising a plurality of horizontally arranged fluidized bed units, each provided with individual bed support grid and an external cyclone, and connected to the next adjacent bed unit by a downcomer. For purposes of description, reactor 10 will be assumed to be a particle classifier in which each stage or module 1 to N is of equal size. Particulate material composed of a full spectrum of sizes between fine and coarse particles which are to be separated or classified are delivered to reactor 10 at one end of the array of stages or modules to module 1 through an inlet conduit 11 located at the center of the narrower side of module 1 and leaves at the other end of reactor 10 through discharge conduit 12 situated on the narrower side of last module N. This last module is shown in greater detail in FIG. 2. There it is seen to include an adjustable overflow weir 13 which controls the depth of the particle bed in the module, and of a chamber 14 where the solids de-fluidize and thereby act as a seal to the flow of fluidizing gas to the bed. Solids in chamber 14 flow under gravity at a rate controlled by the opening of a slide valve 15. This valve can be designed to be adjustable during operation of the reactor, either manually or as part of an automatic process control system to respond to changes in process parameters such as the feed rate or composition of the feed stock.

Referring again to FIG. 1, each module 1 to N is provided with its own independent fluidizing gas inlet 16, gas plenum 17, control valve 20, rotameter 21, perforated bed support grid 22, and solids inlet port 23. Each module is also provided with a cyclone 24 which separates the elutriated material from the exiting gas flow. The elutriated fines product from each module drops into a hopper 25. The particle free elutriating gas can either be blown to atmosphere or, if desired, collected with the gas from the other cyclones through an outlet pipe 26 into a manifold 27 which returns the gas to the blower for recirculation to the gas inlets 16. A valve 30 can be provided on outlet pipe 26 to adjust any difference in outlet gas pressure from different modules due to variations in air velocities or filter resistances. The elutriated and collected solids leaving through a port 31 can be returned to any of the preceding modules through a supplementary inlet connection 32 which leads to the port 23 in the wall of the selected module. Such a supplementary inlet connection is shown in FIG. 1 leading to the rear wall of the module marked N-1. To simplify the drawing, only the first and the last modules are shown in FIG. 1 as having a cyclone 24 but it is to be understood that a cyclone 24 is provided for each module.

The movement of the feed stock solids through the individual modules is regulated by flow-through downcomers which comprise a weir 33 surmounted by an inclined baffle 34. The angle of the baffle is greater than the angle of internal friction of the solids in the bed and is typically about 70 degrees from the horizontal. The solids which flow over the weir de-fluidize in passing over a non-perforated section 35 of support grid 22 thereby acting as a seal to counterflow of the fluidizing gas to the preceding module, thus reducing the backflow of gas through the downcomer to a negligible level. Also, the pressure drop through the downcomer is very low so that no density difference or static head is necessary between two adjacent modules to achieve solids flow through the reactor. Weir 33 may be adjustable in height so as to control the depth of the particle bed in the preceding module. In such case it would comprise a fixed height wall 36 and a vertically slideable plate 37. The particle inventory in a bed may be controlled by the provision of a block 40 which is simply an inert space filler that limits the volume of the module bed.

The design of grids 22 to provide uniform bubbling action over their entire surfaces as well as the necessary distance between bed surfaces and the top of the module to avoid directly flowing the particles out of the module in clumps is well known to those skilled in the art.

There are numerous instances in industrial practice in which a solids product, chemically active or inert, results from the manufacturing process as a powder composed of particles exhibiting a wide variety of sizes and which it is then desirous to separate or classify into a number of narrow if not uniform particle size fractions because in their subsequent use they are, as such, more efficacious whether for handling purposes, in rendering catalytic surface, in consumer acceptance, or in being subjected to further processing as an intermediate additive. This invention, in one of its possible configurations, provides means by which any such mixture of particles exhibiting a wide spectrum of sizes or densities can be easily, controllably, economically, and continuously separated into its individual component sizes or densities. This is accomplished by means of differential elutriation. Air will be used as the elutriatinq or fluidizinq gas in the overwhelming majority of cases because it is free and readily available. However, other gases may be advantageous used under special conditions. For example, nitrogen or flue gas may be used if the solids are highly explosive.

Separation or classification is achieved by means of differential elutriation of the heavier or coarser and the lighter or finer particles. The particles in the upward air flow are subjected to a drag force which varies with their size, shape, and density and are entrained accordingly. At any given fluidizing or aeration rate particles of different size and density exhibit a constant rate of elutriation relative to each other. Their concentration in the exiting aerating stream is also proportional to their concentration in the bulk mixture from which they are entrained by the aerating stream and they leave the aerating stream at an overall concentration which cannot exceed a value commonly referred to as the saturation carrying capacity of the aerating gas.

As they flow downstream from module to module, the bulk solids stream becomes coarser in size distribution while the material in the beds upstream become richer in the finer particle sizes. It is advantageous to increase the gas velocity in the last modules where the material is coarser and to decrease the velocity in the initial modules where it is finer. This velocity gradient is analogous to the temperature gradient along the trays of a conventional distillation column. The velocity profile for the fluidizing gas for the different reactor modules can be easily adjusted to meet the requirements of any separation. The classification characteristics are not dependent on mechanical adjustments but can easily be modified without disassembling the apparatus.

The number of modules in a particle classifier is selected in accordance with the desired cut size and the precision with which the classification is to be effected. The modules should be as small as possible in cross section in order to maximize their number. However, they should be scaled in such a way that for a given gas distribution and bed depth the maximum diameter of the bubbles of the fluidizing or aerating gas bursting on the bed surface in each module remain substantially smaller than the bed cross section in order to maximize entrainment, or in other words, module efficiency. On the other hand, in instances where reactor 10 according to this invention is used for purposes other than particle separation or classification and where it may be preferred to minimize entrainment, the modules can be scaled in such a manner that the maximum stable bubble size is larger than the bed diameter. This will lead to the formation of what is generally referred to as slugs. In addition to limiting entrainment, slugging beds have the merit of being easy to scale up from laboratory test unit size to commercial unit size since their hydrodynamics remain constant. Those skilled in the art are quite familiar with the design of slugging beds.

By way of example, a prototype particle separator will be described that will separate the fines, i.e., particles having a diameter of 88 microns and less from a powder having a particle density of 75 pounds per cubic foot and a particle size distribution as shown in the following table.

| Particle Diameter in Microns | Weight % Less Than Indicated Diameter |
|---|---|
| 600 | 89.68 |
| 500 | 83.33 |
| 425 | 76.19 |
| 354 | 66.67 |
| 300 | 60.32 |
| 210 | 46.03 |
| 180 | 41.27 |
| 149 | 30.56 |
| 125 | 27.87 |
| 105 | 26.22 |
| 88 | 24.94 |
| 74 | 23.80 |
| 63 | 22.33 |
| 53 | 15.60 |
| 45 | 6.70 |

The reactor comprises eight modules arranged according to the configuration shown in FIG. 1. Each module was six inches long and three inches wide. The height of the weir 33 was three inches and the bed depth was six inches. The total height of the reactor was eighty four inches. The air velocity in the first four modules was uniform and equal to one foot per second; it was incrementally increased in modules five to eight by 0.15 foot per second increments. The solids entrained from modules one through four and recovered in the first four cyclones were collected and combined. These were the fines fraction that it was desired to separate from the original powder feed stock. The solids collected in the cyclones associated with modules five through eight were continuously recycled to the immediately preceding module. The feed stock powder from which the fines were to be recovered was fed to the first module at a rate of one hundred pounds per hour.

The recovery of fines, defined as the ratio of the amount of fine material, i.e., particles with a diameter of eighty eight microns or less, collected from modules one through four to the amount of fine particles in the feed stock powder, was 99%. The purity of the fines recovered, defined as the weight percent passing through an eighty eight micron sieve, was 91%.

Figure 4:
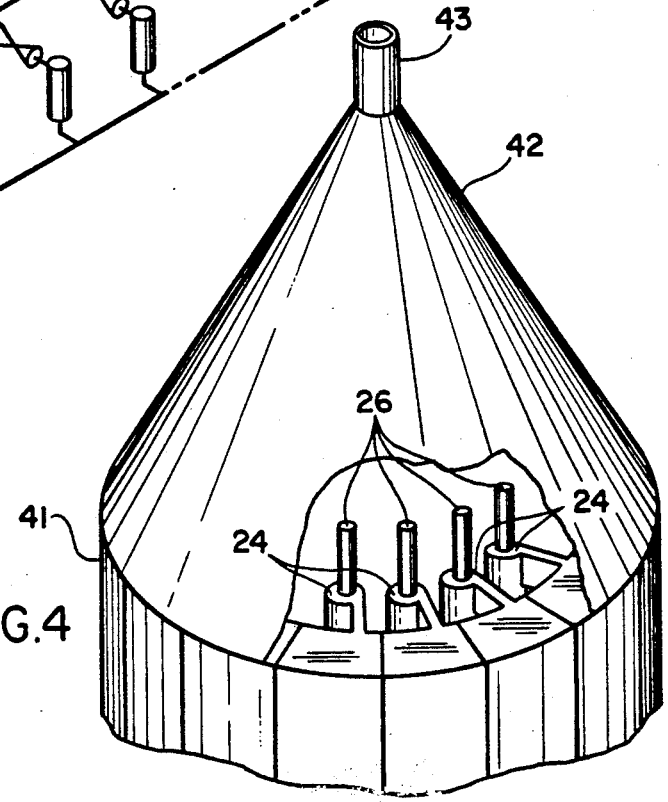
FIG. 4 is a schematic view showing a multi-bed reactor in which the horizontally arranged fluidizing beds are disposed in the annulus between two cylinders so as to be suitable for high pressure processing.

The relative elutriability of particles of different size is negligibly affected by the density or pressure of the fluidizing gas but the rate at which it is introduced is directly proportional to the density of the fluidizing gas. It would therefore be advantageous to operate the particle classifier described above under higher pressures in order to afford either a reduction in reactor size or a greater solid throughput rate. This is possible by using a different embodiment of the invention as shown in FIG. 4. Here the individual modules, instead of being arranged in a linear configuration, are arranged in a circular configuration with a common outer cylinder 41 serving as a pressure containing vessel. Each module, except for its arcuate side walls, is the same as the modules previously described in conjunction with FIGS. 1 to 3. The gas discharge tubes 26 from cyclones 24 could discharge to a common cone shaped plenum 42 atop the reactor and leave through a single nozzle 43.

Although the invention has been described with particular reference to a particle separator or classifier, it is applicable to any processing apparatus or reactor where plug flow of solids is desired to increase processing efficiency, e.g. in drying, coating, or catalytic reaction operations. Thus, when the term reactor is used herein, it is to be understood as meaning a reactor or processing apparatus depending on the particular application for which the apparatus is used.

Having thus described the invention, it is to be understood that many apparently widely different embodiments thereof could be made without departing from the spirit and scope of the invention. For example, in a coating operation, a spray nozzle will be provided in one or more of the modules so that a layer, or several layers, of product can be sprayed on the processed material. It is also possible to alternate coating and drying stages. Therefore it is intended that the foregoing specification and the accompanying drawing be interpreted as illustrative and not in a limiting sense.

What is claimed is:

1. A multi-module particle fractionator for separating particles by size from a feedstock of multi-sized particles comprising: a plurality of particle separating modules arranged in succession, serially connected and in fluid communication with one another, each of said succeeding particle separating modules being similar to a first particle separating module, said first particle separating module including a fluidized bed chamber having an end wall, a support grid through which a gas passes to fluidize particles supported on the grid, an inlet port for feeding particles to be fractionated to said support grid, and an outlet port for discharging a fluidizing gas and elutriated particles from said bed chamber, a gas plenum below said support grid, gas supply means for delivering gas to said gas plenum at a rate to fluidize particles supported on said support grid and elutriate the smaller of said particles, cyclone means connected to said outlet port for separating and collecting elutriated particles discharged through said outlet port, said end wall including a weir and a baffle forming a downcomer for feeding particles overflowing from said fluidized bed chamber of said first particle separating module to the fluidized bed chamber of an adjacent downstream particle separating module; the support grid of said adjacent downstream particle separating module having an imperforate section below said downcomer so that particles are de-fluidized as they are fed into said fluidized bed chamber of said adjacent downstream particle separating module and act as a seal to reduce the flow of fluidizing gas from said adjacent downstream particle separating module fluidized bed chamber to said first particle separating module, and wherein the cyclone means of at least one of said plurality of particle separating modules is connected to the inlet port of a preceding particle separating module for returning particles collected in said cyclone means to a fluidizing bed chamber of a preceding particle separating module, so that smaller particles moving downstream in the overflowing fluid particle stream are recycled to the preceding particle separating module for elutriation therein, the arrangement of particle separating modules being such that initially fine particles and then larger and larger particles are elutriated and collected from the particle stream as it flows downstream through said succession of particle separating modules whereby the particles in the feedstock are fractionated into desired ranges of particle sizes.

2. A multi-module particle fractionator according to claim 1 wherein said plurality of particle separating modules are arranged end to end in an annulus formed between two concentric cylinders that form the side walls of the individual fluidized bed chambers, and wherein said cylinders are pressure resistant vessels.

3. A multi-module particle fractionator according to claim 1 wherein said plurality of particle separating modules are divided into two groups of modules, an upstream group of modules and a downstream group of modules, and wherein said multi-module particle fractionator has means for combining and collecting the elutriated particles separated by the cyclones of the upstream group of modules, wherein the elutriated particles from the cyclone of each module of the downstream group modules is in fluid communication to be fed to the fluidized bed chamber of the next adjacent upstream module, and wherein the cyclone means of the first module in the downstream group of modules is fluidly connected to the fluidized bed chamber of the last module in the upstream group of modules to receive elutriated particles.

* * * * *